Patented May 29, 1923.

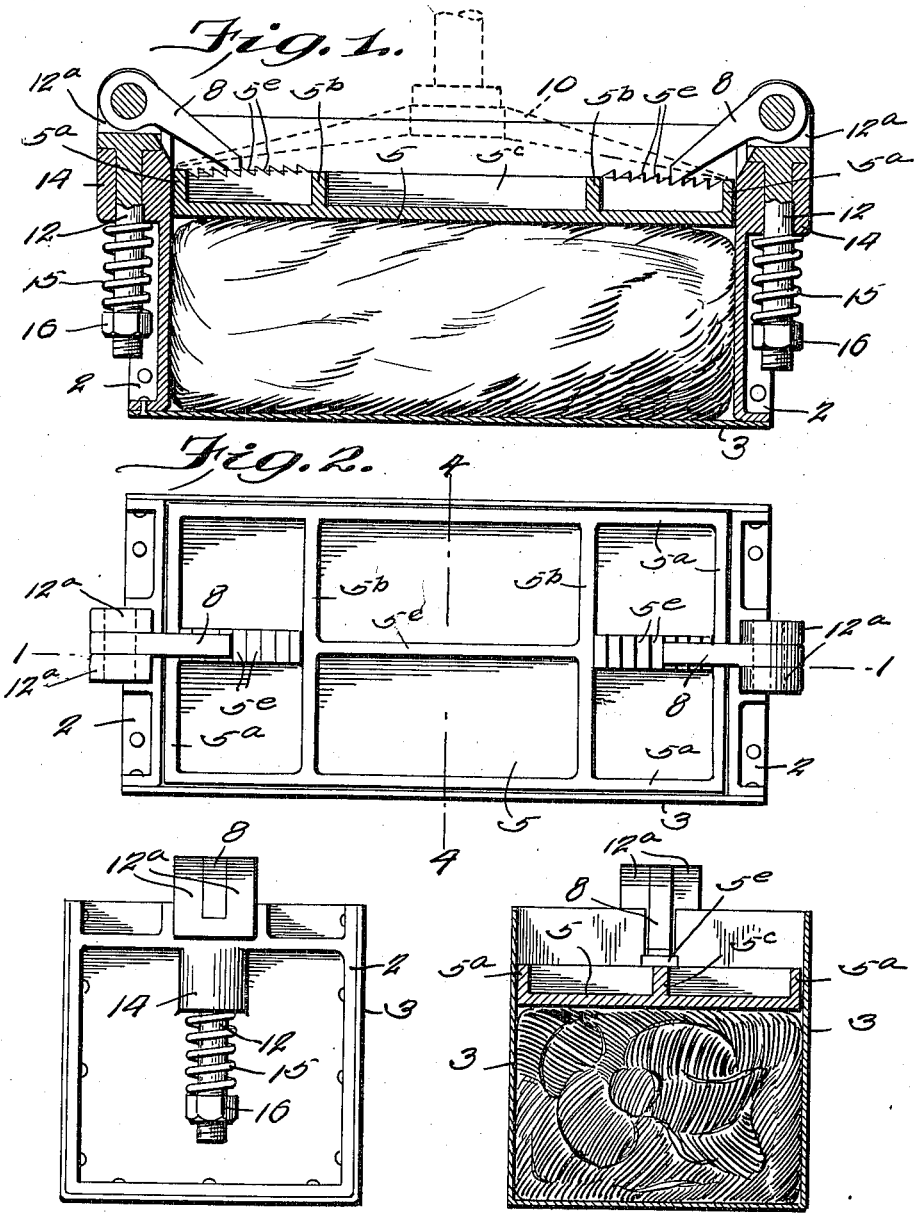

1,456,958

UNITED STATES PATENT OFFICE.

OSCAR M. WOLFF, OF CHICAGO, ILLINOIS, ASSIGNOR TO B. B. HANAK COMPANY, OF CHICAGO, ILLINOIS, A CORPORATION OF ILLINOIS.

MEAT MOLD.

Application filed December 12, 1919. Serial No. 344,438.

*To all whom it may concern:*

Be it known that I, OSCAR M. WOLFF, a citizen of the United States, residing at Chicago, in the county of Cook and State of Illinois, have invented certain new and useful Improvements in Meat Molds, of which the following is a specification.

This invention relates to meat cookers in which hams or other meats are cooked while compressed into a form suitable for slicing, the bones and inedible portions having been previously removed.

There is a demand for cooked hams which may be cut into thin slices and which are of such shape that there is little waste, the most desirable shape being rectangular.

One of the objects of my invention is to provide a cooker in which a boned ham is subjected to such pressure during the cooking operation that it is forced into a rectangular shape, the meat at the extremities being re-distributed so that the texture is made substantially homogenous and all waste is avoided.

In the following description I shall refer to the accompanying drawings in which—

Figure 1 is a longitudinal vertical sectional view of a meat mold and cooker embodying my invention, the same being taken on the line 1—1 of Fig. 2; which is a top plan of the same; Fig. 3, is an end view and Fig. 4 a transverse sectional view on the line 4—4 of Fig. 2.

The box or container is rectangular and may have separate ends 2 riveted to the side and bottom member 3, as shown, or the entire box may be integral, such as a pressed steel stamping.

The top member or cover 5 fits loosely within the box and is reinforced with marginal flanges 5ª and intermediate ribs 5ᵇ and 5ᶜ, the latter having notched serrated end portions 5ᵉ forming racks adapted to cooperate with pawls 8 in securing the top.

After the boned hams are placed in the receptacle or container, the latter is positioned under the pressure plate 10 of a power press and subjected to a pressure of about two thousand pounds. This compacts the meat and causes it to conform to the rectangular shape of the container. As the cover plate is forced down, the pawls 8 descend, moving from tooth to tooth along the racks 5ᵉ and maintain the cover in its lowermost position when the pressure is removed and the containers are transferred to the cooking ovens.

During the cooking process the meat expands, thereby tending to increase the pressure against the cover plate. I have found that this causes a certain proportion of the juices to be expelled which is not only deleterious to the flavor but also causes the meat to become too dry. To overcome this difficulty I have provided means for maintaining a predetermined pressure upon the meat during the cooking operation but permitting an expansion of the container chamber as the meat swells. I have shown one means of accomplishing this result in the accompanying drawings, by securing the pawls 8 to bolts 12 which are slidably carried in lugs 14 on the ends 2 of the container and which are yieldably held against sliding movement by springs 15. The tension on these springs may be adjusted to the desired pressure by means of the nuts 16. The pawls are preferably pivotally held between ears 12ª on the heads of the bolts.

With the construction above described it will be observed that the pressure which will be maintained on the cover plate when the container is removed from the power press will depend upon the resistance of the springs 15 and that this pressure may be predetermined by adjusting the position of the nuts 16 on the bolts 12. As the meat swells and expands during the cooking operation, thereby increasing the upward pressure against the cover plate, the springs permit the bolts and pawls to move upwardly to an amount which will equalize the pressure and bring it within the predetermined amount. The interior space is thus increased in proportion to the expansion of the meat, thereby permitting the juices to be retained within the meat.

By arranging the ratchets along the top of the cover so that the pawls may swing inwardly over the cover, the structure is made very compact and exceedingly rigid, the pawls being advantageously arranged to transmit the thrusts imparted by the upward pressure of the cover.

I have described in detail the particular construction illustrated in the accompanying drawings for the purpose of disclosing one embodiment of my invention, but it will be evident to engineers that various changes and modifications can be made without departing therefrom.

I claim:—

1. A device for molding and cooking meats comprising a casing, a cover slidable therein, and provided with a rack, a bolt mounted for movement in a direction parallel to that of the cover and carrying a pawl to engage said rack, and a spring operating upon said bolt adapted to receive the predetermined pressure upon said pawl.

2. A receptacle for molding and cooking meats comprising a casing, a flat cover slidable therein, yieldable means engaging the cover after the cover is compressed to maintain the pressure exerted upon the contents of the receptacle, and means for varying the pressure exerted by said yieldable means.

3. A meat mold and cooking receptacle comprising a casing having a rigid bottom and also rigid side and end walls, a cover slidable in the casing, said cover having ratchet teeth upon its upper side and adjacent its ends, pawls pivotally supported upon the end walls, and a spring interposed between the pawl and the casing, said pawls being adapted to cooperate by gravity with said ratchet teeth.

4. In a meat mold and cooking receptacle, the combination of a casing having an open top and apertured lugs exteriorly of the casing at opposite points, bolts having abutments thereon, said bolts movable endwise in said lugs, springs carried by the bolts and interposed between the lugs and the abutments on the bolts, pawls pivoted to the bolts at the opposite sides of the lugs to the springs, and a pressure plate bodily movable in the casing and having rack portions at its outer side opposed to the said pawls.

5. In a meat mold and cooking receptacle, the combination of a casing having an open top and apertured lugs exteriorly of the casing at opposite points, bolts having abutments thereon, said bolts movable endwise in said lugs, springs carried by the bolts and interposed between the lugs and the abutments on the bolts, pawls pivoted to the bolts at the opposite sides of the lugs to the springs, and a pressure plate bodily movable in the casing and having rack portions at its outer side opposed to the said pawls; the said abutments on the bolts being adjustable abutments threaded on the bolts for the tensioning of the spring.

In testimony whereof I affix my signature.

OSCAR M. WOLFF.